United States Patent
Yeo et al.

(10) Patent No.: US 7,986,229 B2
(45) Date of Patent: *Jul. 26, 2011

(54) APPARATUS FOR STORING SENSING DATA IN TAG AND METHOD THEREOF

(75) Inventors: Junho Yeo, Daegu (KR); Josef Preishuber-Pfluegl, Klagenfurt (AT); Alex Janek, Graz (AT); Andreas Schuhai, Portschach (AT); Hae-Won Son, Daejeon (KR); Jae-Young Jung, Daejeon (KR); Hee-Sook Mo, Daejeon (KR); Ji-Hoon Bae, Daejeon (KR); Gil-Young Choi, Daejeon (KR); Cheol-Sig Pyo, Daejeon (KR); Jong-Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 779 days.

This patent is subject to a terminal disclaimer.

(21) Appl. No.: 11/931,547

(22) Filed: Oct. 31, 2007

(65) Prior Publication Data

US 2008/0136600 A1    Jun. 12, 2008

(30) Foreign Application Priority Data

Dec. 8, 2006 (KR) .................. 10-2006-0125037

(51) Int. Cl.
*G08B 1/08* (2006.01)
(52) U.S. Cl. .............. 340/539.22; 340/10.51; 340/539.3
(58) Field of Classification Search ............. 340/539.22, 340/539.13, 10.1, 10.2, 10.3, 10.4, 10.5, 340/539.3
See application file for complete search history.

(56) References Cited

U.S. PATENT DOCUMENTS

| | | | | |
|---|---|---|---|---|
| 4,509,141 A * | 4/1985 | Soderberg et al. | ............ | 705/411 |
| 4,528,644 A * | 7/1985 | Soderberg et al. | ............ | 705/410 |
| 4,758,836 A * | 7/1988 | Scuilli | ...................... | 340/870.31 |
| 4,945,477 A * | 7/1990 | Edwards | ....................... | 600/518 |
| 5,214,409 A * | 5/1993 | Beigel | ........................ | 340/572.1 |
| 5,473,322 A * | 12/1995 | Carney | .................... | 340/870.02 |
| 6,128,477 A * | 10/2000 | Freed | ......................... | 455/115.1 |
| 6,882,274 B2 * | 4/2005 | Richardson et al. | ...... | 340/539.13 |
| 6,901,298 B1 * | 5/2005 | Govindaraj et al. | ............ | 700/21 |
| 6,996,733 B2 * | 2/2006 | Hershenson et al. | ......... | 713/340 |
| 7,126,493 B2 * | 10/2006 | Junker et al. | ............. | 340/870.02 |
| 7,193,923 B2 * | 3/2007 | Nishihara et al. | ........ | 365/230.03 |
| 7,391,323 B2 * | 6/2008 | Hoshina | ..................... | 340/572.1 |
| 7,400,253 B2 * | 7/2008 | Cohen | ........................ | 340/572.1 |
| 7,407,110 B2 * | 8/2008 | Davis et al. | ............. | 235/472.02 |
| 7,447,513 B2 * | 11/2008 | Anttila et al. | ................. | 455/519 |

(Continued)

FOREIGN PATENT DOCUMENTS

JP        06-089377        3/1994

(Continued)

*Primary Examiner* — Daniel Wu
*Assistant Examiner* — Rufus Point
(74) *Attorney, Agent, or Firm* — Kile Park Goekjian Reed & McManus PLLC

(57) ABSTRACT

An apparatus for storing sensing data in a tag and a method thereof are provided. According to the present invention, data measured by the sensor is stored in volatile memory and important data from among the data stored in the volatile memory is stored in non-volatile memory according to a pre-set data loss prevention mechanism so that a battery and the tag including the battery have a longer life and stability of data can be secured.

7 Claims, 3 Drawing Sheets

U.S. PATENT DOCUMENTS

| | | | |
|---|---|---|---|
| 7,606,679 B1* | 10/2009 | Voicu et al. | 702/183 |
| 7,634,688 B2* | 12/2009 | Madter et al. | 714/24 |
| 7,667,603 B2* | 2/2010 | Bolander et al. | 340/572.4 |
| 2003/0163287 A1* | 8/2003 | Vock et al. | 702/187 |
| 2005/0148828 A1* | 7/2005 | Lindsay | 600/300 |
| 2005/0210475 A1* | 9/2005 | Hepworth et al. | 719/310 |
| 2005/0216121 A1 | 9/2005 | Sawada et al. | |
| 2006/0047888 A1* | 3/2006 | Nishihara et al. | 711/103 |
| 2006/0069814 A1* | 3/2006 | Abraham et al. | 710/8 |
| 2006/0136656 A1* | 6/2006 | Conley et al. | 711/103 |
| 2006/0279412 A1* | 12/2006 | Holland et al. | 340/10.51 |
| 2007/0034691 A1* | 2/2007 | Davis et al. | 235/382 |
| 2007/0056369 A1* | 3/2007 | Griffin et al. | 73/504.14 |
| 2007/0139200 A1* | 6/2007 | Yushkov et al. | 340/572.1 |
| 2007/0233752 A1* | 10/2007 | Bangalore et al. | 707/202 |
| 2007/0254080 A1* | 11/2007 | Schackmuth et al. | 426/523 |
| 2007/0266350 A1* | 11/2007 | Fulga et al. | 716/4 |
| 2008/0016005 A1* | 1/2008 | Owen et al. | 705/73 |
| 2008/0041930 A1* | 2/2008 | Smith et al. | 235/375 |
| 2008/0123605 A1* | 5/2008 | Cho et al. | 370/338 |
| 2008/0129506 A1* | 6/2008 | Schuessler | 340/572.1 |
| 2008/0155257 A1* | 6/2008 | Werner et al. | 713/168 |
| 2008/0313389 A1* | 12/2008 | Chow et al. | 711/103 |
| 2009/0121837 A1* | 5/2009 | Kitayoshi et al. | 340/10.1 |

FOREIGN PATENT DOCUMENTS

| | | |
|---|---|---|
| JP | 2005-316724 | 11/2005 |
| JP | 2006-178770 | 7/2006 |
| JP | 2006-268359 | 10/2006 |
| KR | 10-2004-0076589 | 9/2004 |
| WO | WO2005057688 | 6/2005 |

* cited by examiner

APPARATUS FOR STORING SENSING DATA IN TAG AND METHOD THEREOF

CROSS-REFERENCE TO RELATED PATENT APPLICATION

This application claims the benefit of Korean Patent Application No. 10-2006-0125037, filed on Dec. 8, 2006, in the Korean Intellectual Property Office, the disclosure of which is incorporated herein in its entirety by reference.

BACKGROUND OF THE INVENTION

1. Field of the Invention

The present invention relates to the field of Radio Frequency Identification (RFID), and more particularly, to an RFID tag device which communicates with an RFID reader.

The present invention is derived from the research performed as a part of the information technology (IT) new growth power core technology development business, which was hosted by the Ministry of Information and Communications Republic of Korea (MIC) and the Institute for Information Technology Advancement (IITA) [Task management No.: 2005-S-106-02, entitled "Development of Sensor Tag and Sensor Node Technologies for RFID/USN"].

2. Description of the Related Art

A Radio Frequency Identification (RFID) is a process or chip which puts information about processes of producing, distributing, storing, and selling products into a tag attached to the products, has its own antenna, makes a RFID reader read the information, and connects with an artificial satellite or uses mobile communication in order to access an information system.

Meanwhile, a RFID system includes a tag and a reader, wherein the tag stores information and exchanges data according to a protocol and the reader communicates with the tag.

The RFID tag can be classified into an active type and a passive type, wherein the active type needs a power source and uses a direct power supply, and the passive type is operated by an electromagnetic field of the reader without power being supplied directly from inside or outside of the RFID tag. By using the active type, required power for the reader is reduced and an identification distance may be far from the reader. However, since a power supply device is needed, the operation time is limited and the cost of the active type is more expensive than the passive type. On the other hand, the passive type is lighter than the active type, the cost of the passive type is less than the active type, and the passive type can be used semi-permanently. However, when the passive type is used, an identification distance is short and more power is consumed by the reader, compared to when the active type is used.

In addition, a battery powered passive tag, which combines the active type and the passive type, has been suggested.

According to the conventional battery powered passive tag, a non-volatile memory is generally used as a storing means for stability of data. However, the amount of power consumption is large and thus, the life of the tag is reduced. In particular, such a problem arises more seriously in a sensor tag which is generally used in a ubiquitous sensor network (USN). That is, the sensor tag periodically stores various environmental factors measured by the sensor, for example, temperature and humidity, in the non-volatile memory. The power source used for such a process is supplied from the internal battery, instead of the RF power transmitted from the reader, and so, when the battery is used up, data can no longer be stored.

SUMMARY OF THE INVENTION

The present invention provides an apparatus for storing sensing data in a tag and a method thereof, which easily stores data while minimizing power consumption according to a power supply environment.

According to an aspect of the present invention, there is provided an apparatus for storing sensing data in a tag which communicates with a Radio Frequency Identification (RFID) reader, the apparatus including: a sensing unit which senses or measures information about environmental surroundings of the tag; a volatile memory which stores resultant data sensed or measured by the sensing unit; a non-volatile memory which stores resultant data sensed or measured by the sensing unit; and a control unit which stores resultant data sensed or measured by the sensing unit in the non-volatile memory, when the current capacity of the power remaining in the tag which can operate the tag is below a pre-set level, and firstly stores resultant data sensed or measured by the sensing unit in the volatile memory and then moves the data stored in the non-volatile memory to the non-volatile memory according to pre-set conditions, when the current capacity of the power remaining in the tag which can operate the tag is above the pre-set level.

The apparatus may further include a power supply unit which supplies the power required to operate the tag according to a predetermined control strategy; a power receiving unit which receives an RF signal including the operating power of the tag from the RFID reader; and a power management unit which measures a strength of the RF signal received from the power receiving unit and supplies the power of the power supply unit or the RF power received from the RFID reader to the tag according to the strength of the RF signal.

According to another aspect of the present invention, there is provided a method of storing sensing data in a tag which communicates with a RFID reader, the method including: sensing power remaining in a battery included in the tag; when power remaining is sensed to be below a pre-set level, storing data which senses or measures information about environmental surroundings of the tag by using a sensor included in the tag in a non-volatile memory in the tag and when power remaining is sensed to be above a pre-set level, storing the data in a volatile memory in the tag; and moving the data stored firstly in the volatile memory according to pre-set conditions to the non-volatile memory, so as to be stored.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 1:
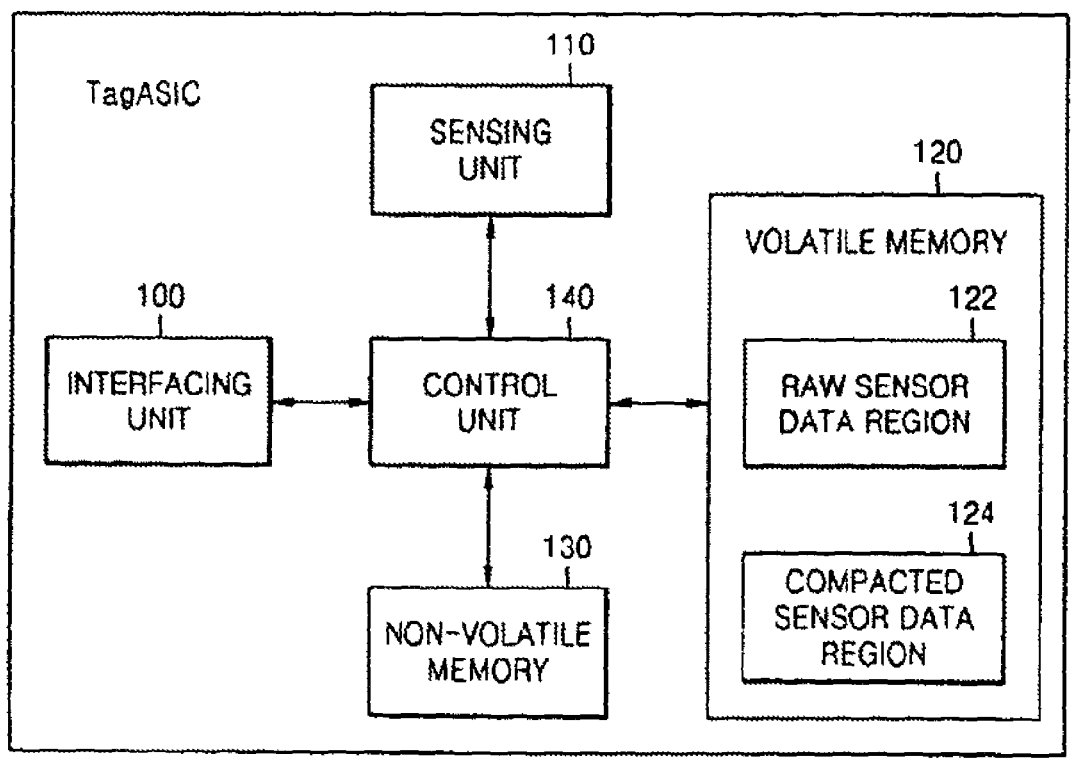
FIG. 1 is a block diagram of an apparatus for storing sensing data in a tag according to an embodiment of the present invention.

FIG. 1 is a block diagram of an apparatus for storing sensing data in a tag according to an embodiment of the present invention.

The apparatus in a tag which communicates with a Radio Frequency Identification (RFID) reader through an interfacing unit 100 includes a sensing unit 110, a volatile memory 120, a non-volatile memory 130, and a control unit 140. The sensing unit 110 senses or measures information about the environment surrounding the tag. The volatile memory 120 firstly stores resultant data sensed or measured by the sensing unit 110. The non-volatile memory 130 stores resultant data sensed or measured by the sensing unit 110 under some situation.

The control unit 140 stores resultant data sensed or measured by the sensing unit 110 in the non-volatile memory 130, when the current capacity of the power remaining in the tag is below a pre-set level. The control unit 140 firstly stores resultant data sensed or measured by the sensing unit 110 in the volatile memory 120 and then moves the data stored in the volatile memory 120 to the non-volatile memory 130 according to the pre-set condition, when the current capacity of the power remaining in the tag is above the pre-set level.

The volatile memory 120 includes a raw sensor data region 122 and a compacted sensor data region 124. Both elements will be described later with reference to FIGS. 2 and 3.

In addition, the apparatus further includes a power supply unit, a power receiving unit, and a power management unit (such elements are not illustrated in the drawing). The power supply unit supplies the power required to operate the tag according to a predetermined control strategy. The power receiving unit receives an RF signal including the operating power of the tag from the RFID reader. The power management unit measures the strength of the RF signal received from the power receiving unit and supplies the power of the power supply unit or the RF power received from the RFID reader to the tag according to the strength of the RF signal.

The interfacing unit 100 provides a function of an RF interface.

The sensing unit 110 includes at least one sensor and senses or measures the environment surrounding the tag.

The control unit 140 may include a program that is appropriate for control purposes according to the present invention and devices such as a CPU. Also, the power supply unit may include a power source such as batteries.

The interfacing unit 100 performs wireless communication with the RFID reader, signal processing, and RF power supply, which is received from the RFID reader, and includes an antenna, a voltage multiplying unit, a demodulator, and a modulator.

The power management unit manages the RF power supplied from the RFID reader. Such management can be performed under the control of the control unit 140. The strength of the RF power input through the antenna and the voltage multiplying unit is measured and as a result, if the power is not sufficient, the power management unit can use the battery power for the power required in the tag. Moreover, the power management unit measures the remaining amount of battery power and corresponding 'remaining information' is output to the control unit.

Figure 2:
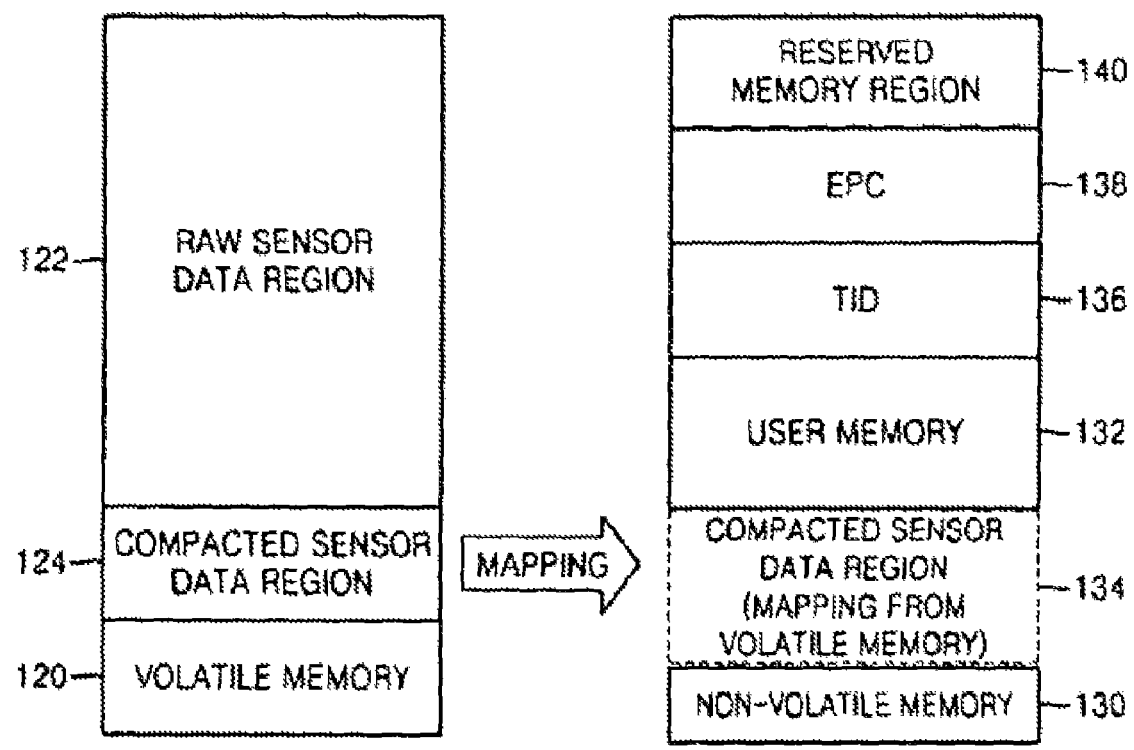
FIGS. 2 and 3 are diagrams of a memory of a sensor tag equipped with a volatile memory according to an embodiment of the present invention.
Figure 3:
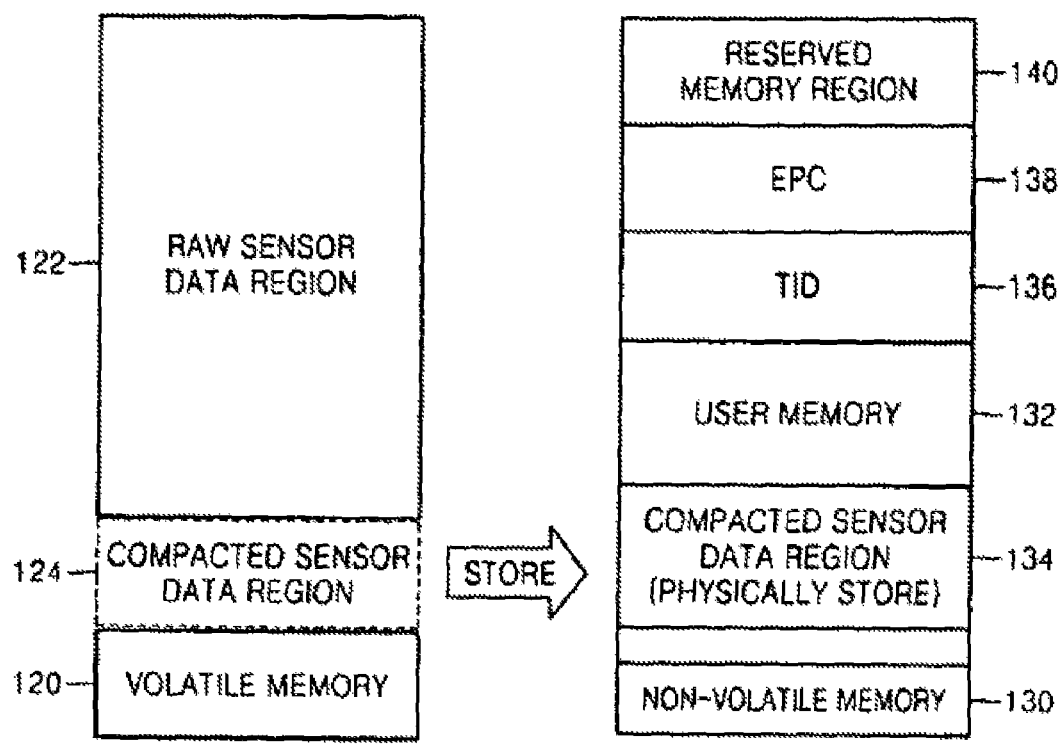

FIGS. 2 and 3 are diagrams of a memory of a sensor tag equipped with a volatile memory according to an embodiment of the present invention.

It is well known that the volatile memory 120 has a risk of losing data compared with the non-volatile memory 130 with respect to storing data. However, power consumption for reading and writing data is lower than that of the non-volatile memory 130.

The volatile memory 120 includes the raw sensor data region 122 and the compacted sensor data region 124 as illustrated in FIG. 1. The non-volatile memory 130 includes a reserved memory region 140, an Electronic Product Code (EPC) 138, a Tag Identifier (TID) 136, a user memory 132, and a compacted sensor data region 134. In FIGS. 2 and 3, focus is on a regional division, for example, the volatile memory 120 is illustrated as it is separated from the raw sensor data region 122 and the compacted sensor data region 124.

As illustrated in FIGS. 2 and 3, the non-volatile memory 130 is a region where important value added information can be stored according to an application service based on the EPC global standards and can be classified into the user memory 132, the reserved memory region 140, the TID 136, and the EPC 138, wherein the user memory 132 is determined to be used according to a user, the reserved memory region 140 stores a kill password needed to disuse the tag and an access password needed to handle a lock flag for accessing the memory (write or read data), the TID 136 stores tag information, and the EPC 138 stores information about a product to which the tag is attached.

In addition, the volatile memory 120 stores measurement data from the sensor. The measurement data from the sensor is firstly stored in the raw sensor data region 122 and important data extracted from the raw sensor data region 122 is stored in the compacted sensor data region 124. In particular, the compacted sensor data region 124 is mapped to the user memory 132 of the non-volatile memory 130 and the mapped region is illustrated as the reference numeral 134.

Meanwhile, the list stored in the compacted sensor data region 124 is illustrated in Table 1.

TABLE 1

| Parameter | Description |
|---|---|
| Tag internal sensor ID | Tag internal sensor respectively given to a sensor |
| Number of samples | Total number of estimated values stored in VM that is related to a sensor designated by a tag internal sensor ID |
| Minimum value (including time stamp, when time stamp is stored with sensor data, same as below) | Minimum value from among estimated values stored in VM that is related to a sensor designated by a tag internal sensor ID |
| Maximum value (including time stamp) | Maximum value from among estimated values stored in VM that is related to a sensor designated by a tag internal sensor ID |
| Last captured value (including time stamp) | The last value captured by a sensor designated by a tag internal sensor ID |
| Tendency of recent 10 values (if it is possible to get 10 values, as many values as possible) | Tendency of recent 10 values (when the total number of the measured values is smaller than 10, all values are used). The tendency may rise, fall, be fixed, or change. |
| Measuring start time | Time stamp of a first sample stored in VM that is related to a sensor designated by a tag internal sensor ID |
| Alarm value and time stamp | When the sensor designated by a tag internal sensor ID generates an alarm, the related value and the time stamp of the value are stored. If not, the file is represented as empty. |

The control unit stores sensing data input from the sensing unit 110 to the volatile memory 120. Here, when power is not supplied to the volatile memory 120, information stored in the volatile memory 120 is lost. Thus, in order to prevent this, the control unit manages data according to two loss prevention mechanisms.

The first loss prevention mechanism is described below.

When a remaining amount of battery power is at the pre-set level or below the pre-set level according to the result of analyzing the remaining information input from the power managing unit, the data sensed by the sensing unit 110 is stored in the user memory 132 of the non-volatile memory 130, instead of the volatile memory 120. In this case, it is represented as 'stored', as illustrated in FIG. 3. It is separated from the mapping in FIG. 2 in which data is firstly stored in the volatile memory 120 and then is moved again in the non-volatile memory 130. If a remaining amount of battery power is above a criterion, the sensed data is firstly stored in the volatile memory 120.

The second loss prevention mechanism is described below.

Based on four events generated as described below, data that is pre-set in the compacted sensor data region 124 of the volatile memory 120 is stored in the user memory 132 of the non-volatile memory 130.

A first event is a 'reader command' received from the RFID reader. When the reader command is input through the demodulator, the control unit performs the second loss prevention mechanism. Here, the second loss prevention mechanism should be performed by using the RF power that is received with the reader command so that the power of the battery is not consumed while the second loss prevention mechanism is performed.

Before the first event is performed, when power remaining information input from the power managing unit indicates that the remaining amount of battery power is not sufficient, the control unit 140 controls the modulator by using the RF power transmitted from the RFID reader so as to transmit a signal indicating that there is no battery, to the RFID reader, thereby transmitting the signal through the interfacing unit 100. Accordingly, a response signal of the RFID reader may be the reader command mentioned above.

A second event is based on an 'exceeded amount' of the power remaining after the power is supplied to each element of the tag by using the RF power received from the RFID reader. In order to prevent the exceeded amount from being discarded, the control unit (CPU) 140 supplies the exceeded amount to the volatile memory 120 and the non-volatile memory 130 and performs the second loss prevention mechanism. Here, the power of the battery should not be consumed.

A third event is based on the case when the remaining amount of the battery power is at the pre-set level. When such case is detected, the second loss prevention mechanism is performed.

In a fourth event, the second loss prevention mechanism is performed at predetermined intervals. Such a predetermined time can be changed.

As described above, battery power consumption in the tag due to data storage and maintenance thereof is minimized and data storage and maintenance thereof can be reliably accomplished.

In addition, it is obvious to one of ordinary skill in the art that each process can be embodied in ways with software or hardware by using a general programming method.

According to the present invention, data measured by the sensor is stored in the volatile memory and important data from among the data stored in the volatile memory is stored in the non-volatile memory according to the pre-set data loss prevention mechanism so that the battery and the tag including the battery have a longer life and stability of data can be secured.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for storing sensing data in a tag which communicates with a Radio Frequency Identification (RFID) reader, the apparatus comprising:
   a sensing unit which senses or measures information about environmental surroundings of the tag;
   a volatile memory which stores resultant data sensed or measured by the sensing unit, the volatile memory comprising:
      a raw sensor data region which stores resultant data sensed or measured by the sensing unit; and
      a compacted sensor data region which stores at least one data parameter extracted from the sensed or measured data stored in the raw sensor data region;
   a non-volatile memory which stores extracted parameter data or resultant data sensed or measured by the sensing unit; and
   a control unit which stores resultant data sensed or measured by the sensing unit in the non-volatile memory when the current capacity of the power remaining in the tag which can operate the tag is below a pre-set level, and firstly stores resultant data sensed or measured by the sensing unit in the raw sensor data region of the volatile memory, extracts at least one data parameter from the sensed or measured data stored in the raw sensor data region, and stores the extracted data parameter in the compacted sensor data region, and then moves the extracted at least one data parameter stored in the compacted sensor data region of the volatile memory to the non-volatile memory according to pre-set conditions when the current capacity of the power remaining in the tag which can operate the tag is above the pre-set level.

2. The apparatus of claim 1, further comprising:
   a power supply unit which supplies the power required to operate the tag according to a predetermined control strategy;
   a power receiving unit which receives an RF signal including the operating power of the tag from the RFID reader; and
   a power management unit which measures a strength of the RF signal received from the power receiving unit and supplies the power of the power supply unit or the RF power received from the RFID reader to the tag according to the strength of the RF signal.

3. The apparatus of claim 1, wherein the pre-set conditions are based on a command received from the RFID reader.

4. The apparatus of claim 1, wherein the control unit moves data that is firstly stored in the volatile memory to the non-volatile memory by using the power remaining from the power excited by the RF signal received from the RFID reader.

5. The apparatus of claim 1, wherein the pre-set conditions comprise the case when the data is firstly stored in the volatile memory and remaining power is below a criterion.

6. The apparatus of claim 1, wherein in the pre-set conditions, data is moved to be stored according to a pre-set time interval.

7. The apparatus of claim 1, wherein the data that is firstly stored in the volatile memory and then moved to the non-volatile memory comprises at least one of a sensing unit ID, a total number of values stored after sensing and measuring by the sensing unit, a minimum value, a maximum values, last values from among the values stored, a rising, falling, fixing or changing tendency of 10 recently sensed or measured values, a time stamp of the first value, an alarm value generated by the sensing unit, and parameters of the time stamp.

* * * * *